(12) United States Patent
Treadway Fancher

(10) Patent No.: US 11,745,918 B2
(45) Date of Patent: Sep. 5, 2023

(54) REUSABLE WAX WARMER LINER

(71) Applicant: Rebecca Ann Treadway Fancher, West Monroe, LA (US)

(72) Inventor: Rebecca Ann Treadway Fancher, West Monroe, LA (US)

( * ) Notice: Subject to any disclaimer, the term of this patent is extended or adjusted under 35 U.S.C. 154(b) by 0 days.

(21) Appl. No.: 17/301,307

(22) Filed: Mar. 31, 2021

(65) Prior Publication Data

US 2021/0214125 A1     Jul. 15, 2021

Related U.S. Application Data

(63) Continuation-in-part of application No. 16/231,093, filed on Dec. 21, 2018, now abandoned.

(51) Int. Cl.
| | |
|---|---|
| *B65D 65/06* | (2006.01) |
| *B25G 1/10* | (2006.01) |
| *B65D 25/16* | (2006.01) |
| *B62K 21/26* | (2006.01) |
| *A63B 60/14* | (2015.01) |

(52) U.S. Cl.
CPC .......... *B65D 25/16* (2013.01); *B65D 2203/00* (2013.01)

(58) Field of Classification Search
CPC ... B65D 25/16; B65D 2203/00; Y02W 30/80; C11C 5/004; B08B 17/04
See application file for complete search history.

(56) References Cited

U.S. PATENT DOCUMENTS

| | | | | |
|---|---|---|---|---|
| 1,256,913 | A * | 2/1918 | Luellen | B65D 83/0805 221/63 |
| 3,573,430 | A * | 4/1971 | Eisler | H05B 3/565 219/385 |
| 7,355,153 | B1 * | 4/2008 | Nuzzolillo | H05B 6/6426 219/754 |
| 8,104,114 | B2 * | 1/2012 | Ton | A61H 33/6068 4/655 |
| 8,809,744 | B2 * | 8/2014 | Stewart | A61L 9/037 219/386 |
| 9,516,973 | B2 * | 12/2016 | Young | F24V 30/00 |
| 10,086,102 | B2 * | 10/2018 | Belongia | H05B 3/78 |
| 10,207,018 | B2 * | 2/2019 | Gasper | A61L 9/012 |
| 10,342,886 | B2 * | 7/2019 | Banco | B29C 48/87 |
| 2009/0271922 | A1 * | 11/2009 | Ton | A61H 35/006 4/655 |
| 2012/0181284 | A1 * | 7/2012 | Young | B65D 35/46 220/500 |

(Continued)

*Primary Examiner* — Kevin R Kruer

(57) ABSTRACT

The present invention discloses a liner made to fit and have direct contact within the warming dish of a wax warmer to serve the purpose of receiving, melting, cooling, remolding, removing, storing, re-using and safely discarding scented wax. The wax may be removed from the liner by method of flexibly release the cooled wax from its edges and base. The emptied liner may then be reused, disposed or recycled. The present invention is shaped to fill a variety of wax warmer designs, as well as for structural stability for multiple uses or branding purposes. Such contours on the sides and bottom of the liner help prevent the formation of condensation or vacuum forming, which can hinder both the removal and release of the liner from the receiving portion of a wax warmer or warming platform and aid in the removal of the solidly formed wax from within the liner itself.

1 Claim, 1 Drawing Sheet

(56) References Cited

U.S. PATENT DOCUMENTS

| | | | | |
|---|---|---|---|---|
| 2013/0213383 A1* | 8/2013 | Young | ................... | F24V 30/00 |
| | | | | 126/263.08 |
| 2014/0044425 A1* | 2/2014 | Beesley | ................... | A61L 9/03 |
| | | | | 392/386 |
| 2015/0283280 A1* | 10/2015 | Belongia | ................... | A61L 9/03 |
| | | | | 392/386 |
| 2016/0346419 A1* | 12/2016 | Gasper | ................... | H05B 3/24 |
| 2017/0153043 A1* | 6/2017 | Young | ................... | B65D 35/38 |
| 2017/0232126 A1* | 8/2017 | Faterioun | ................. | H05B 3/42 |
| | | | | 239/136 |
| 2017/0238364 A1* | 8/2017 | Belongia | ................... | A61L 9/03 |
| | | | | 219/422 |
| 2019/0313763 A1* | 10/2019 | Hodges | .............. | A45D 26/0014 |
| 2019/0359386 A1* | 11/2019 | Jakilinki | ................ | H05B 3/681 |
| 2020/0205235 A1* | 6/2020 | Anderson | ............ | H05B 3/0071 |

\* cited by examiner

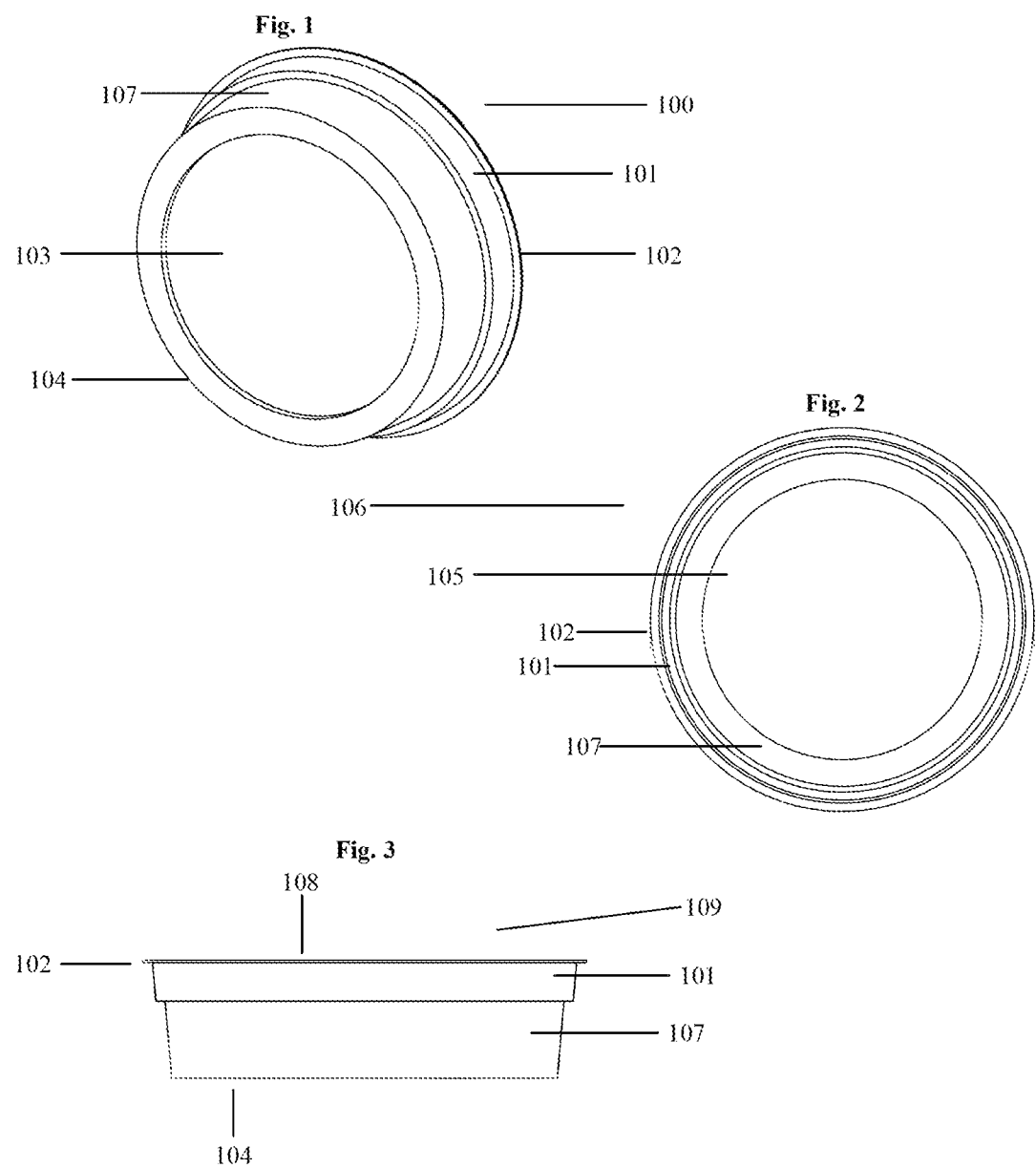

REUSABLE WAX WARMER LINER

FIELD OF THE INVENTION

The present invention, the reusable wax warmer liner, is a method of containing, melting, re-molding, removing and storing wax from the reservoir dish of a wax warmer, and which also may be used as an independent reservoir in conjunction with the heat source of a standard low wattage bulb within the wax warmer, or directly seated onto a warming platform of a wax candle warmer used to melt candles in glass jars without the benefit of open flame. The present invention is a contourably shaped reusable wax warmer liner and is preferably manufactured of a heat transferable polymer to be reusable, recyclable or disposable, while allowing simple, safe and effective containment and removal of used wax from the tray of a wax warmer, and which protects and maintains the integrity of the wax, the liner and the wax warmer itself by forming a barrier between the melted wax and the tray of the wax warmer, allowing the reuse of the liner and the wax once removed and if properties are intact.

BACKGROUND OF THE INVENTION

The use of scented wax for the purpose of creating a pleasant ambient atmosphere within a particular surrounding is not new or novel. Candles, being the primary and most original form of wax used for this purpose, are the most common use of scented wax and have been in existence in one form or another since the flame was recognized as a light and heat source. As elements were added to create scent and/or medicinal properties, candles became a decorative, yet useful household means of not only a light source, but also to mask or improve the atmosphere of an area of space. Before electricity, flame was the only means of melting wax. Fast forward to 'modern times.' Electricity brought an independence from the use of open flame, although the appeal of the flame still, to this day, is preferable to some, and candles still remain a popular source of creating a desired atmosphere that is both aesthetically pleasing and useful. However, an open flame carries risks. Among them, the danger of fire under an unwatchful eye and subsequent changes in molecular properties of everything that burns, which can lead to the dangerous effects of inhaling burning material from the wax itself, making wax melting preferable to burning for aromatherapy purposes.

A popular way of warming wax is by using a wax warmer, which is a canister-type structure with a heat source, usually a low wattage light bulb or low electrical current for warming which heats a dish designed and used to melt wax. Another way to melt wax is by using an electrical warming dish or platform on which a candle in a glass container is placed to melt, rather than to use the wick to burn, to create the atmospheric effects of the wax.

While the effects of warming scented wax in a wax warmer may be pleasant, the removal of the wax is quite the opposite. Wax can be removed in one of two ways: as a molten liquid, while still hot, or as solid, when cooled. Upon removing or discontinuing the heat source, wax solidifies quickly, so even molten or hot liquid wax will start to crumble into messy little flakes once most of the molten wax is removed or poured out. These flakes can fall onto surfaces and become next to impossible to remove, as wax permeates most surfaces. Safety is always an issue with molten wax, which is hot and may cause spillage from haste in disposing or may cause dropping and breaking the warmer or removed reservoir, burns to the skin, damage to surfaces on which it may spill, such as fabric, walls, countertops, skin, hair, pets. Regardless, the removal of wax is so tedious that most people procrastinate cleaning the warmer and some even abandon the use of the wax warmer altogether.

Until now, there has been no clear path to effectively cleaning a wax warmer. Traditional methods include not removing the wax at all, and abandoning the use of the warmer, pouring out the molten wax, risking spillage onto surrounding surfaces or skin, then wiping out the residual wax while it cools rapidly and crumbles into messy flakes that scatter everywhere, or using absorbent material such as cotton balls or paper toweling to soak up the molten wax, then finish wiping out the residual wax which still creates the messy situation previously mentioned. Scraping with sharp objects or freezing also are methods users have conjured to remove melted wax from a wax warmer. It is this author's personal opinion that prevention is preferable to cleaning. By creating a means to keep a wax warmer clean, the warmer itself can be used more frequently, retaining its original purpose of maintaining a pleasant atmosphere within a given environment.

Upon realizing the need for a preventive measure for maintaining the integrity of a wax warmer by eliminating messy wax build-up and preventing dangerous spillage when discarding molten wax, this author (Rebecca Ann Treadway Fancher) presented a clearly acceptable means of removing used wax from a wax warmer in US 2019/0168272 A1. In that application, the author points out the need for a means to safely and cleanly melt scented wax within the reservoir of a wax warming mechanism, removing the liner for reuse of the wax, or discarding the cooled and solid wax if the wax properties are no longer useful. This author also points out the invention may be used to store wax for future use, should the properties not be eliminated, or emptied and reused indefinitely, making this invention reusable. The current application is a CIP (continuation in part) based upon the first application, US 2019/0168272 A1.

DETAILED DESCRIPTION OF THE INVENTION

The present invention is described in the following paragraphs referencing the drawings that accompany the current application for a Reusable Wax Warmer Liner, referred to in this description as "liner." FIGS. 1-3. These descriptions are to provide detail, but are non-limiting concerning context or claims of this invention.

The embodiment of the liner is used to hold and maintain melted wax, acting as a barrier between the wax and the surface of the dish of a wax warmer. The liner is designed in a way to hold the melting wax while warming and emanating aromatic or therapeutic properties during the heating process. The value of the liner is to contain the wax while being warmed, then cooled, and to flexibly release the solidified wax so the liner can be re-used, and to preserve the wax for later use if desired properties remain after initial use.

The features of the liner consist of a top edge, which is an outwardly formed flange 102 that serves the purpose of helping to stabilize the liner within the dish of a wax warmer by resting on the upper ledge of the dish or by touching the sides of the inner wall of the dish, aiding in keeping the liner centered and upright, as well as providing a gripping opportunity for removing the liner from the wax liner dish. The liner may be one of a variety of shapes, with the surrounding wall 107 reflecting the desired shape, such as round, square, rectangle, etc., and having a tiered portion 101 to provide additional structural stability to retain its shape and prevent shrinking or distortion of the liner walls. A ridge 104 also provides structural stability and promotes even heating and helps prevent the buildup of moisture and vacuum forming by raising the recessed bottom portion 103 off of the heated base of the dish of a wax warmer.

In FIG. 1, the liner is viewed from a side bottom view for a perspective of the overall appearance of the invention. The inner recessed base portion 105 shown in FIG. 2 of the top opening view 106 is where an additional decorative or identifying logo would be placed, adding to the structural value by providing supporting contours to the base, which would be seen on the solidified wax, once removed by "popping out." The side view 109 of FIG. 3 depicts the top opening of the liner 108 that holds the wax.

DESCRIPTION OF RELATED ART

Wax warmers are mechanisms that use a heat source, usually a low wattage light bulb, or conductive electrically heated plate, to melt wax which is contained in a provided dish located over the heat source. Some wax warmers are heated by means of a small candle with open flame, called a votive style candle, but many are warmed with electricity, eliminating the need for an open flame, thus making this style of wax warmer an arguably safer method of melting wax and further preferred over open flamed candles. However, not all electric wax warmers are alike. Aside from the actual design and decorative value of the wax warming containers, there are two basic versions of wax warmer styles: larger countertop versions and smaller wall outlet plug-in versions. Of these two categories, there are several workable designs including a stand-alone one piece unit such as in U.S. Pat. No. 10,207,018; a two part unit, with removable reservoir for holding and melting wax, with an opening above the heating element, usually a light bulb, when the reservoir is removed; a two or multiple part unit, with removable reservoir for holding and melting wax, with a conductive heat plate under the removable reservoir, as in U.S. Pat. No. 10,311 B2, S.C. Johnson and Son, Inc. and U.S. Pat. No. 10,086,102 B2 S C Johnson and Son, Inc.; and a two part unit, containing a removable reservoir, a heat/light source, and a fan for enhancing the elements of the warmed wax within the reservoir such as in U.S. Pat. No. 7,067,772 B2, Tanner, Brent Robert and Jacobson, Greg Gerard.

There are now two published patent applications that mention the need for a liner for wax warmers. Since publication of this author's first application, there is now another published application for an invention in similarity, US 2019/0359386 A1, Siva Jakilinki, for a "Disposable Liner Container for Wax Warmer," which is now abandoned. The patent application Pub. No US 2019/0359386 A1, Siva Jakilinki was not known, therefore not referenced, at the time of the first patent application for the Wax Warmer Liner by this author in the first application, Pub. No US 2019/0168272 Rebecca Ann Treadway Fancher, and was not published until after the present author's application was published.

Jakilinki's claims hinge upon a liner, preferably metallic, containing opposing structurally integrated 'wings' used for the removal of the liner while hot, and the wax still molten, for the obvious express purpose of immediate disposal, making his invention primarily a single use disposable, and not practical for personal safety or surroundings while disposing of the molten wax. Should the wax be disposed, or poured out, from the liner container while molten, as is stated in his specification, the same situation would take place as having to remove molten wax from the reservoir of a wax warmer itself, and his liner would not be useful for the purpose of his claims. His claims also mandate that the base, or bottom of the liner is flat, so that 'the entire surface of the base of the liner container is in contact with the upper surface of the dish,' which ensures the that maximum heat of the liner container is retained for a period of time, even upon removal from the heat source, whether the material of the liner container is metallic or other composition, which also allows more time for mishaps.

In the invention of Jakilinki, it is suggested that the molten wax be at once discarded, by pouring out the molten wax from the liner, which would still cause spillage or splattering, creating a mess or causing danger with burning skin or embedding hot wax in clothing, surface materials, hair or pets, and leave the liner with residual wax, which would cause scent mixing or further cleaning of the liner itself, should the liner be re-used. It is additionally implied that the liner should be discarded upon removal, along with the molten wax, presumably to avoid the dilemma of spillage or additional cleaning of the liner and using a new and different liner to replace the one removed. This clearly indicates the invention is preferred as a single use item and not practical for reusable purposes. Furthermore, the use of metallic materials is not practical nor preferred, due to the excessive heat conductive properties of metals. The heat retainment of the metallic liner would prolong the molten state of the wax, even when removed from the heat source, and the heat conducted throughout the liner and into the 'wings' attached for removal purposes would retain heat for a period of time as well, causing an issue with removal due to the risk of burning or blistering fingers, or dropping the liner to avoid burning or blistering fingers, which would cause dangerous spillage or splattering and may also cause possible combustion when discarding the hot metallic liner in a trash can or disposing receptacle. The aforementioned claims hinge upon the 'wings' of the liner being a means for grasping the liner while hot, to remove it from the warming device. Metal, itself, is not practical, due to the fact it conducts heat at a greater rate than other elements, dissipating the useful and desired elements of the wax more quickly and renders the 'wings' as ineffective or even problematic for the purpose of removal.

The previous application of this author, Rebecca Ann Treadway Fancher, Pub. No: US 2019/0168272 A1, portrays a broad view of the use and structural context of a liner, expressing the need for a containment device for the purpose of holding and melting wax within the receiving portion, or dish of a traditional wax warmer. The claims allow for a reusable, yet disposable preferably polymeric liner, made in a variety of geometric shapes and sizes, for easy and clean removal of wax from the reservoir and acting as a barrier between the wax and the structure of the wax warmer, to maintain a new and clean appearance of the wax warmer and prevent scent mixing and messy wax buildup within the dish of the wax warmer. The current claims include items of structural value, such as contours, method of wax release and removal from the liner itself, as well as the liner being used as independent stand-alone dish of the wax warmer, replacing the use of a removable reservoir of the wax warmer, if the design of the warmer allows. This independently used liner would be useful with a candle warming plate as well, which stands alone as a warming platform or plate without the benefit of a surrounding structure of a warming device or wax warmer. The purpose of the present claims is to substantiate the claims of this author's previous application as well as to establish new and improved claims of the previous original invention. In awareness of, in reference to and in comparison with the proposed invention of Jakilinki, there are many significant differences in the current Continuation in Part of the original application of Pub. No US 20190168272 Rebecca Ann Treadway Fancher, which will be detailed in the following paragraphs of this specification.

DESCRIPTION OF THE DRAWINGS

Description accompanies the various views of the Reusable Wax Warmer Liner illustrations.
  FIG. 1 depicts the bottom side view of the invention
  FIG. 2 depicts a top view looking down into the liner
  FIG. 3 depicts a side view of the liner
  100—The Reusable Wax Warmer Liner from a bottom side view
  101—The tier formed into the side portion of the liner for structural and stability purposes
  102—The outwardly formed flange surrounding the perimeter of the open edge of the liner
  103—The recessed portion of the bottom of the liner, surrounded by the structural ridge (104)
  104—The raised ridge formed on the bottom perimeter of the liner
  105—Inner view of the recessed portion of the bottom of the liner
  106—Top view of the liner from the open edge, looking down inward
  107—Side wall of the liner
  108—The opening at the top of the liner
  109—Side view of the liner

SUMMARY OF THE INVENTION

The present invention is a reusable liner to contain melted wax within the warming dish of a wax warmer, to re-mold and store cooled scented wax and the method of removing the melted, cooled and solidified wax from within the reusable liner itself. The invention comprises a reusable liner for conducting and transferring heat to melt the wax which is placed within the liner for the purpose of creating an ambient atmosphere of pleasant or therapeutic scent with aromatic properties. The liner is constructed of a material that is heat conductive to allow the contained wax to melt without the liner itself melting and while retaining the integrity of the wax and its properties, as well as maintaining the integrity of the wax warmer and the liner itself. The material may be, but is not limited to, a polymer, preferably flexible, such as polyethylene, or polyethylene blend, recycled polymer, polypropylene or may be of silicone or metallic coated paper material, which is not as preferable, but that may be reusable, yet disposable or recyclable. The polymer may be clear, as to be aesthetically pleasing while not distracting from the appearance of the wax warmer.

The liner contains contours to add to the stability and longevity of the structure. The liner may be sized and designed to fit the shape of the wax warmer dish in which it sits, such as round, square, rectangle, convex, concave or fluted, with flat or raised bottom portion, but not limited to these structural values. The molded structure consists of a bottom portion and side portions, as one piece. The sides may be perpendicular, or angled outward to accommodate the dish of a wax warmer, and increase stability and durability of the liner itself. The bottom base contains ridges or designs, such as logos, in the recessed area of the underneath portion, which will be embedded in the wax when it solidifies in the liner, and is visible in the solid wax when removed by flexibly releasing the wax, when solid, from the sides and bottom. The contours may be ridges, various 'steps' or 'tiers' in the side walls, fluted edges and sides, a flange or any given variety of designs. Liners that have angled sides, slight or obvious, would be stackable, which would make it easier to present in a multi-pack for retail purposes or space saving storage. A ridge may be formed around the circumference of the bottom portion which holds the liner up off of the flat surface of a heating element or wax warmer reservoir, which still allows the liner to evenly transfer heat and melt the wax inside, while preventing a vacuum or moisture from forming underneath when heating, which could deform or warp the bottom of the liner and cause the liner to stick to the dish of the wax warmer.

Structural contours include a ridge around the perimeter of the bottom of the base of the liner. This is to allow for even heating and prevent overheating as well as avoid the moisture or vacuum buildup that can occur with condensation when liquid is heated on a flat surface. The bottom ridge will promote the release of the liner from the wax warmer dish by raising it off of the floor of the warming dish rather than laying completely flat against the floor of the warming dish. Logos or shaped designs may be integrated in the recessed interior of the bottom base of the liner, inside the ridged perimeter, which, when the wax is melted then cooled and solidified within, and removed by method of popping out, will reveal the contours as well as the logo, and serve the purpose of continued enjoyment and promotion of seeing the logo and shapes of the newly formed wax. This can then be kept for storage purposes or given as gifts, if so desired. Other contours that help with structural stability are 'steps' or 'tiers' in the sides of the liner, giving strength to the structure that will be crucial to the longevity of the liner when it is heated over a period of time, or multiple times. Particular polymers have a tendency to break down or shrink over time when in contact with consistent heat, and adding structural value enhances the stability of the polymer and lessens the chance the liner will shrink or deform during sporatic use or withstanding consistent heat. An outwardly formed flange surrounds the perimeter of the open top edge and adds to the structural value of the liner, as any creases or contours add strength to the liner structure. The flange also serves to help stabilize the liner within the dish by resting on the upper ledge of the warming dish or by touching the inner wall of the dish, aiding in keeping the liner centered and upright. The flange also is useful for gripping purposes when removing the liner from the warming dish after use.

The liner is purposed for placement within the wax holding dish of a traditional wax warmer, or may be used as an independent reservoir by being placed directly on or above the heat source in a wax warmer, depending on the design of the warmer itself. Some wax warmer heating elements are not strong enough and are ineffective in heating or melting the scented wax. If the warmer is designed with a removable dish independent of the warmer base, the liner may be placed over the heat source, such as a low wattage light bulb, replacing the dish, or directly onto the wax warming tray, should the warmer be so designed, and therefore itself becomes the wax warmer dish. This also would be beneficial as a reusable and disposable replacement dish, should the original wax warmer dish become lost or broken. The reusable liner also may be placed directly onto the warming platform of a candle warmer, which only consists of an electrically warmed base, purposed to heat a candle through a glass container, rather than burning it.

A clear, heat transferring, aesthetically pleasing proprietary polymer that maintains both the integrity and appearance of the wax warmer and the wax, is preferable as a material for this invention, although it is not limited to any given clarity, color, polymer or material. Other materials, such as metal, silicone or heavy paper, would be inadequate, although possible, and may even pose possible dangers while changing the appearance of the wax warmer itself. Metal, aluminum or foil covered cardboard will conduct heat quickly and use up properties of wax at a greater rate, lessening the lifetime of the scent or properties of the wax. Metals heat more quickly than other resources, and also retain the heat longer. Thus, removing the metal from the heat source may lead to burns or blisters, and may cause reflexive dropping of the metal container, or the wax warmer itself, leading to additional problems with broken pieces, or splattered molten wax. Silicone is not preferable because its properties are scientifically heat resistant and porous, which would render the item ineffective. Over time, the used wax would permeate the porous structure and would encourage scent mixing and even leaking. Paper, cardboard, or foil covered cardboard is ineffective in that it takes longer to conduct heat from the source, and cools too rapidly and is not intended for use within a heat source, extended use or multiple uses. These paper related materials are absorbent as well, and also would encourage scent mixing and leakage over time. If the heat source is over-heated, it may cause scorching of the paper element, which then could cause safety concerns.

The present invention is considered a reusable/disposable, being used multiple times as desired, then discarded or recycled and replaced. The liner is purposed to be used in a variety of warmers and with a variety of waxes, and not limited to one particular type or brand of either, making the invention independent and universal in value. The average range of area within the dish portion of a wax warmer is up to 3.5". The liner may be used for storage for used wax with still usable properties, or emptied and reused in the method and fashion set forth in the following paragraph.

The beauty of this invention, the reusable wax warmer liner, is the ability to empty the used wax from the liner, while maintaining the usefulness of the liner, the used wax and the wax warmer. The liner, acting as a barrier between the melting wax and the dish of a wax warmer, helps maintain the integrity and cleanliness of a wax warmer dish, which encourages use and eliminates the aforementioned problems that come with cleaning wax from a wax warmer. The wax is flexibly removed from the liner by eliminating the heat source, turning off the electric power supply, allowing the wax to cool and solidify. Once solid, pressure is manually applied inside the liner around the perimeter in an outward manner and manual pressure is applied to the bottom of the liner in an inward manner, and when it is inverted, this pressure forces or "pops" the wax out in a single piece or several pieces, rather than spilling a hot liquid mess or producing and spreading flaky wax fragments that are difficult to remove. The liner is now clean and free to use again. The wax is also ready to be stored or reused, if it has maintained its properties, or discarded safely. Once the liner has been reused and is no longer needed or effective, it may be discarded, or recycled if possible.

What I claim as my invention is the following:

1. A wax warmer liner consisting of:
    a single piece of metal coated paper, said single piece consisting of a bottom, a tiered side wall, and a top;
    said bottom consisting of an outer perimeter; a continuous, symmetric, ridge; and a center portion;
    wherein said continuous, symmetric ridge extends downward entirely a round said outer perimeter of said bottom, and wherein said continuous, symmetric ridge extends inward from said outer edge toward said center portion of said bottom;
    and wherein said center portion of said bottom is elevated above said continuous, symmetric, downward ridge;
    said tiered side wall consisting of a single tier, a bottom section located below said single tier, and an upper section located above said single tier, said upper section and said lower section being angled outward from said outer perimeter of said bottom and said single tier consisting of a section extending parallel to said center portion of said bottom, and
    said top which is parallel to said center portion of said bottom and which has an outer perimeter larger than said outer perimeter of said bottom, and wherein said top consists of an edge and a flange formed continuously and outwardly from said edge and wherein said flange is parallel to said center portion of said bottom;
and wherein said wax warmer liner has an interior area up to 3.5 square inches.

* * * * *